United States Patent
Wells

(10) Patent No.: US 11,450,227 B2
(45) Date of Patent: Sep. 20, 2022

(54) METHOD, SYSTEM, APP OR KIT OF PARTS FOR TEACHING MUSICAL RHYTHM, IN PARTICULAR PERCUSSION

(71) Applicant: BEATBALANCE LTD., Scotland (GB)

(72) Inventor: Neil Wells, Scotland (GB)

(73) Assignee: BEATBALANCE LTD., Glasgow (GB)

( * ) Notice: Subject to any disclaimer, the term of this patent is extended or adjusted under 35 U.S.C. 154(b) by 0 days.

(21) Appl. No.: 17/617,443

(22) PCT Filed: Jun. 30, 2020

(86) PCT No.: PCT/IB2020/056203
§ 371 (c)(1),
(2) Date: Dec. 8, 2021

(87) PCT Pub. No.: WO2021/009603
PCT Pub. Date: Jan. 21, 2021

(65) Prior Publication Data
US 2022/0208019 A1    Jun. 30, 2022

(30) Foreign Application Priority Data

Jul. 13, 2019 (GB) .................................. 1910077
Apr. 17, 2020 (GB) .................................. 2005643

(51) Int. Cl.
*G09B 15/02*     (2006.01)
*G04F 5/02*      (2006.01)
(Continued)

(52) U.S. Cl.
CPC ........... *G09B 15/023* (2013.01); *G04F 5/025* (2013.01); *G09B 5/06* (2013.01); *G09B 15/003* (2013.01)

(58) Field of Classification Search
CPC ...... G09B 15/023; G09B 5/06; G09B 15/003; G04F 5/025
See application file for complete search history.

(56) References Cited

U.S. PATENT DOCUMENTS 3,905,269 A    9/1975    Doerksen et al.
7,320,643 B1   1/2008    Brosius et al.
(Continued)

FOREIGN PATENT DOCUMENTS

JP          H096361 A   *  1/1997
WO   WO-2010055537 A1  *  5/2010   ............. G09B 15/00

OTHER PUBLICATIONS

International Preliminary Report on Patentability (Chapter II) dated Oct. 25, 2021 from PCT Application No. PCT/IB2020/056203.
(Continued)

*Primary Examiner* — Jianchun Qin
(74) *Attorney, Agent, or Firm* — Innovation Capital Law Group, LLP; Vic Lin

(57) ABSTRACT

Musical rhythm, is taught using a sequenced rhythm pattern, wherein a user's strike within a time window around each note maintains suppression of audible output. If a strike falls outside the time window, output resumes. FIG. 2 shows a smartphone/tablet app. Pad 13 is struck in harmony with a rhythmic pattern on display 1. Means 3 to 11 adjust app parameters. Means 2 control rhythm. A display preferably shows current and past states of the system during a session (e.g. metronome suppressed, metronome non-suppressed, strike detected in time window, strikes outside time window), as well as time remaining in the current session, as either a 'clock' or 'pie chart' type, or rectilinear 'bar' type, the 'time remaining' segment of the display being progressively replaced by sections e.g. of differing colour or texture corresponding to the current state, with the 'time past' segments displaying the past states.

27 Claims, 9 Drawing Sheets

(51) Int. Cl.
*G09B 5/06* (2006.01)
*G09B 15/00* (2006.01)

(56) References Cited

U.S. PATENT DOCUMENTS

| | | |
|---|---|---|
| 7,557,287 B2 | 7/2009 | Wilson et al. |
| 2002/0062726 A1* | 5/2002 | Abe .................... G10H 1/0016 84/738 |
| 2007/0089592 A1 | 4/2007 | Wilson et al. |
| 2007/0234885 A1 | 10/2007 | Schmidt et al. |

OTHER PUBLICATIONS

International Search Report & Written Opinion dated Aug. 17, 2020 from PCT Application No. PCT/IB2020/056203.
United Kingdom Search Report dated Jan. 16, 2020 from Application No. GB1910077.5.

* cited by examiner

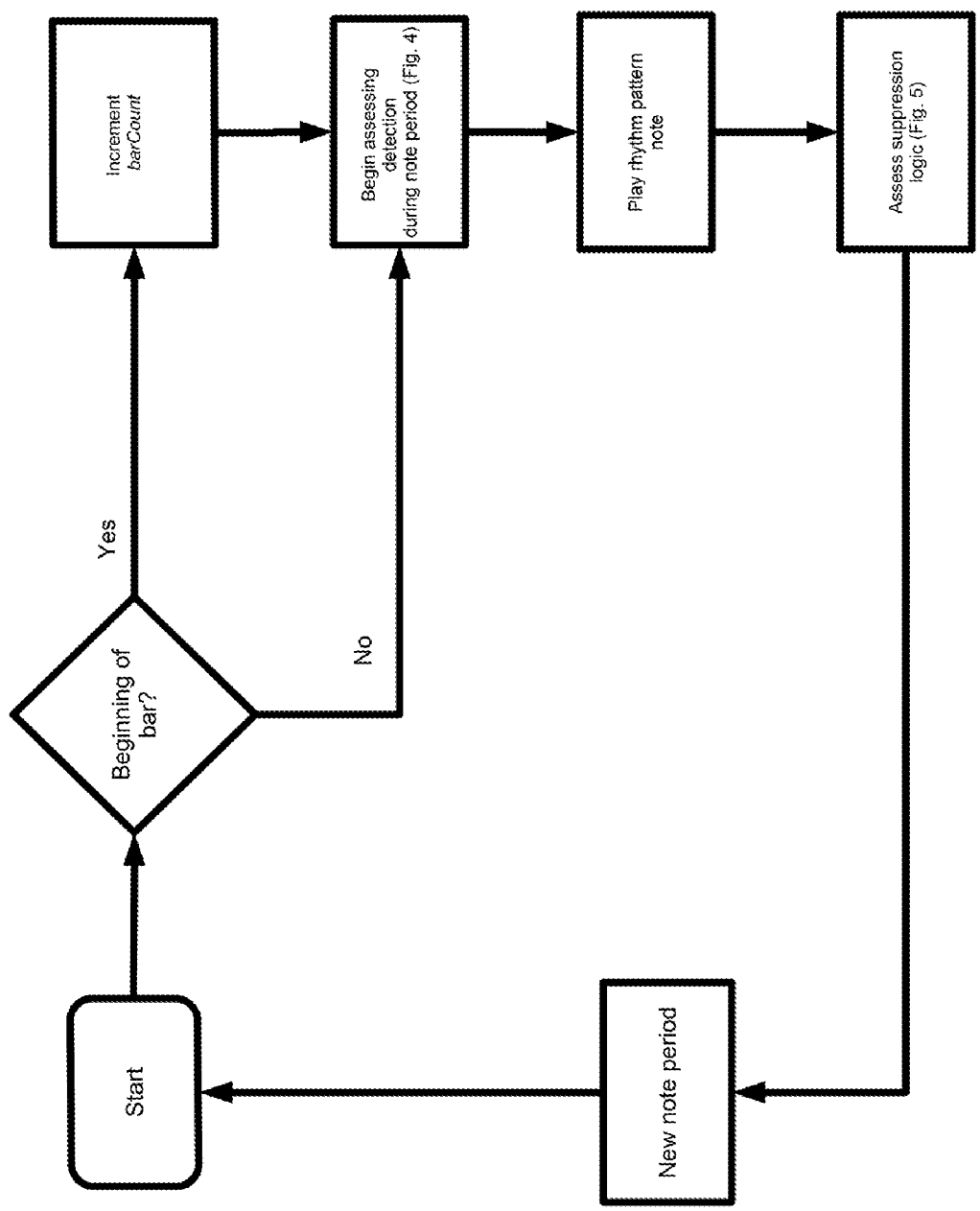

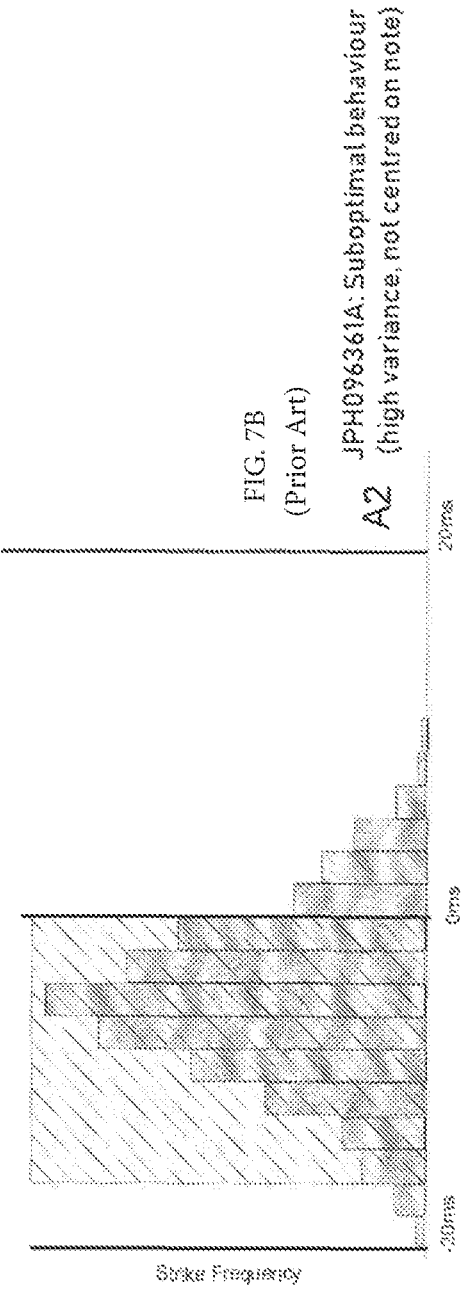

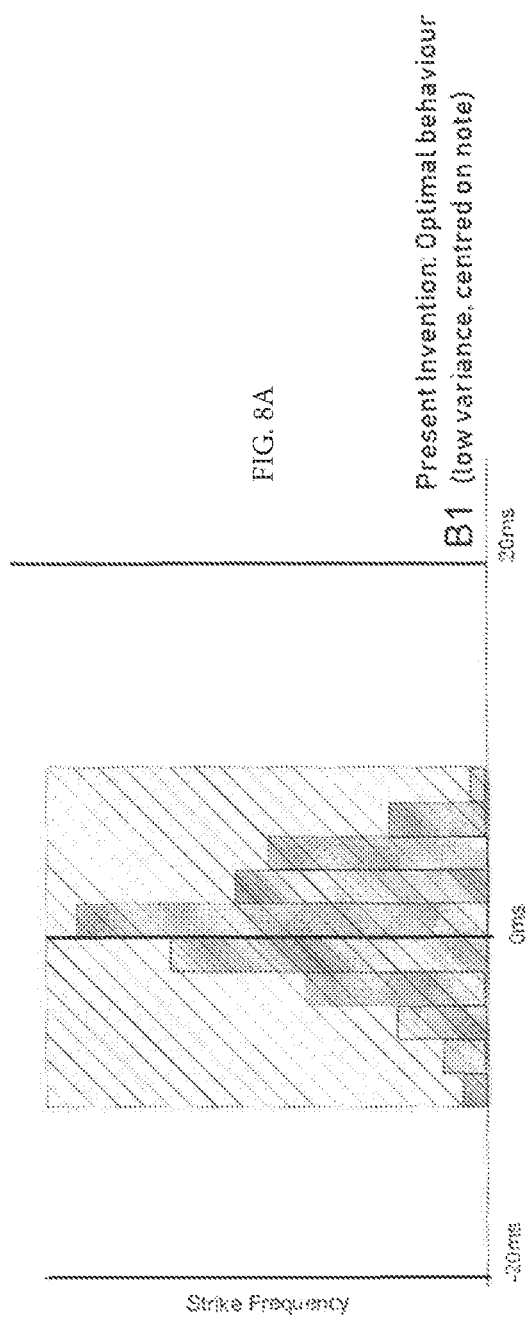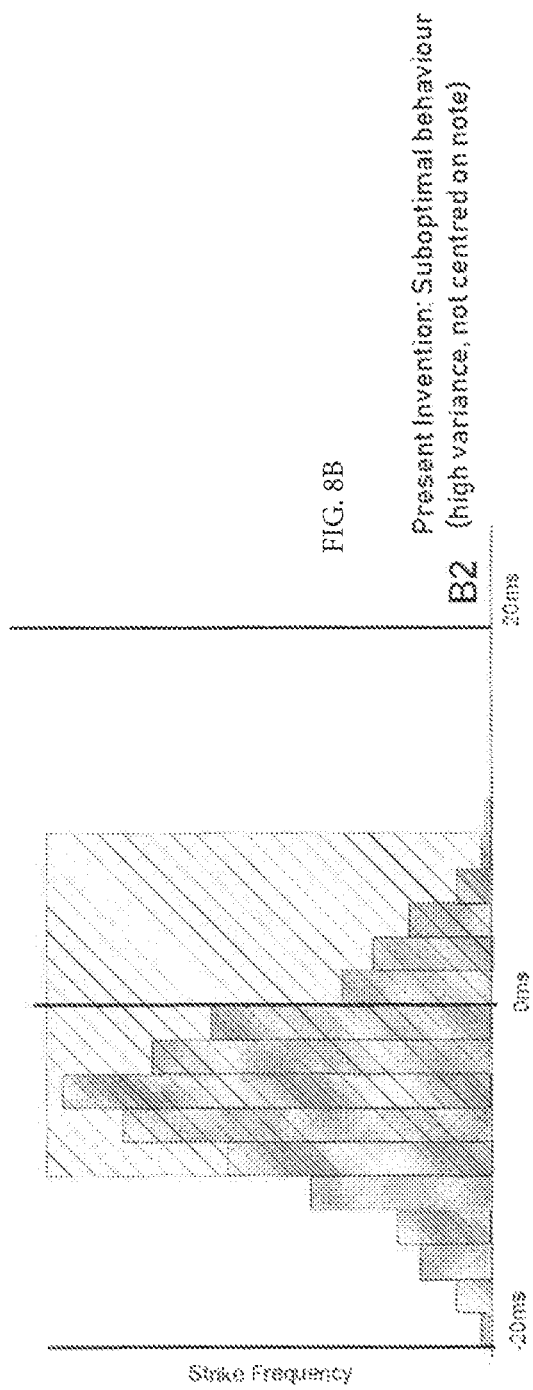

METHOD, SYSTEM, APP OR KIT OF PARTS FOR TEACHING MUSICAL RHYTHM, IN PARTICULAR PERCUSSION

BACKGROUND OF THE INVENTION

1. Field of the Invention

The present invention relates to methods and systems for teaching musical rhythmic accuracy and stability while playing unsupported by a metronome click or other rhythmic guide. The invention primarily relates to percussion teaching. The term "teaching" as used herein may obviously also be described as e.g. training or learning.

The present invention is aimed in particular at providing an optimised feedback system to allow a player to develop confident macro-time (tempo stability) and micro-time (note spacing) consistency in their drum playing without the support of a metronome in a manner analagous to the use of stabilizer training wheels to allow children to confidently ride a bicycle.

The novel insight underpinning the present invention is the application of this "training wheels" type feedback system to metronome-based rhythm practice.

So long as playing is correct, the experience of using the system is qualitatively identical to playing completely unsupported. The feedback mechanism only operates when the user's playing is suboptimal.

In other words, the rhythmic guide track or metronome is silenced as long as the user plays the target pattern in time. Should they deviate from this, the audible output is made audible again to enable the user to resynchronise their playing.

2. Description of Prior Art and Related Information

In many forms of ensemble music playing (for example, rock music), the drummer usually assumes responsibility for timekeeping: providing a rhythmic guide for the other members of the ensemble to play against.

In order for other group members to be able to play confidently, it is important that they are able to rely on the drummer to maintain control over the tempo of their own playing, without unintentionally speeding up, slowing down, or inconsistently varying tempo.

Tempo control is a skill which requires a large amount of focused, deliberate practice to achieve. Hours of daily practice over many years are required to achieve a professional level of skill.

Drummers who have not practiced this skill will commonly gradually increase in tempo over the course of a song, or during musical sections of increased dynamic or musical intensity.

Even when a drummer becomes capable of maintaining a constant tempo while playing one pattern, it is common for them to be unable to maintain tempo stability when moving between different drum beats or when playing drum fills.

The importance of this skill set has been further increased by the conventional use in modern music recording practice of recording to a 'click track'—a sequenced rhythmic guide intended to ensure that a recording session maintains a consistent tempo. In order to successfully record in this fashion, it is important that a drummer is able to play comfortably and musically along with a click guide.

A separate but closely related skill is 'note spacing'—the ability to maintain consistent time relationships between played notes within a pattern. Poor note spacing will result in drum beats sounding 'sloppy' and unconfident, and other musicians will also be unable to play their parts with confidence. For example, poor note spacing will result in musical elements intended to sound simultaneously to one another (e.g. a bass drum strike, a hi-hat strike and a bass guitar note) sounding slightly out of time with one another in an inconsistent fashion. This 'sloppy' playing is distinct from 'loose' drum playing by a highly skilled drummer, where time relationships between notes are complex but reliable.

Traditionally, tempo stability and note spacing are both practiced using a metronome to determine a consistent tempo.

However, the use of a metronome presents a number of problems. Because the metronome is an artificial tempo support, practice to a metronome can lead to a drummer becoming skilled at entraining their playing to a metronome, rather than in maintaining a consistent tempo. In a manner analogous to the use of a walking frame or crutch to aid walking, the ability to successfully perform with the aid of the support does not in itself guarantee unsupported performance.

Furthermore, a metronome pulse is usually provided in an audible form. This can result in the metronome sound masking the sound of the instrument, meaning that can be difficult to practice tempo stability and note spacing while also paying proper attention to other important aspects of playing, particularly dynamic consistency and control between drum strokes.

These problems can be somewhat ameliorated by the use of metronomes allowing programmable muting of portions of a pattern, or allowing random muting. For example, the "Time Guru" (Trade Name) metronome app allows a programmable percentage of metronome notes to be randomly silenced. Alternatively, preset periods of the metronome may be muted—for example, alternating 2 bars of metronome click with 2 bars of silence.

While this is a useful means of practicing tempo stability and note spacing, it still has a number of significant limitations.

Firstly, the metronome pulse is still partially present, with the attendant masking problems.

Secondly, at slower tempos or for longer periods of silence, it can be difficult to locate the source of a timing inaccuracy—if, after 4 bars of silence (a period of 12 seconds at 80 BPM), the metronome is audibly out of time with the played pattern it is clear that an error (or errors) occurred at some point during those 12 seconds, and whether those errors in aggregate resulted in a net tempo increase or decrease, but that is the extent of the feedback available.

Finally, a periodic reintroduction of the metronome inherently limits the proportion of practice time spent rehearsing the skill to be improved, even if the skill is being performed well.

A more qualitative problem is that the form of playing adopted under these circumstances can be somewhat unnatural and trade off tempo stability against note spacing—instead of playing naturally and confidently, it is tempting to try and maintain tempo stability by compensating for any perceived note spacing errors with an error in the opposite direction. This can result in even highly skilled drummers playing sloppily or tentatively under these circumstances. The source of this problem is once again the artificiality of the practice environment compared to the real world application.

SUMMARY OF THE INVENTION

The present invention seeks to solve these problems by providing a method for practicing playing rhythmic patterns with good tempo stability and note spacing without the support of a metronome click, via a method analogous to the use of training wheels for childrens' bicycles.

As with training wheels, the underlying notion is that feedback should only be provided as a safety net, allowing the user to build confidence in their own internal stability. The system also has the advantage of providing clear and immediate feedback on user error, enabling faster and more targeted learning. When playing optimally, the subjective experience of using the system should be identical to that of playing unsupported.

Patent JPH096361A describes a system similar in many respects to the proposed system: a drum practice pad defining a time window within which a timely strike suppresses playback of the metronome sound.

JPH096361A: Difference in Intended Purpose

The purpose of JPH096361A, is described in terms of minimising the volume of pad practice and its capacity to disturb others. While such a pad is arguably (somewhat) effective for this purpose, the algorithm and system as described in detail would be ineffective when applied to the purpose of the present invention—ie, developing rhythmic timing accuracy in the player.

The choice of preferred embodiment for JPH096361A clearly demonstrates that the insight described above is not a motivating factor for the inventor of JPH096361A. Although it would be relatively simple for a skilled person in hindsight of the present invention to modify the system described in JPH096361A to suit this purpose, without this insight the system is not fit for purpose as described.

JPH096361A lacks several features essential to the use of this type of system as a 'training wheels' type practice system: namely,
- an allowable time window centred on the metronome pulse (for reasons detailed below),
- a system to ensure consistent suppression behaviour of the following note of the metronome/rhythm pattern,
- a system to allow a number of non-suppressed rhythm notes to play upon a deviation from the intended behaviour in order to allow the player to re-synchronise their playing.

Ineffectiveness of the Preferred Embodiment of JPH096361A when Applied to the Purpose of the Present Invention Because human rhythmic timing can never be expected to be 100% percent precise (even expert players exhibit timing variations on the order of 5-10 ms), the target behaviour when practicing rhythmic accuracy is for the frequency distribution of timing errors for each strike of a pattern to form a normal distribution centred on the time of the beat output by the pattern generator.

An accurate playing of the rhythmic pattern therefore consists of a distribution of timing errors with i) low variance and ii) a central tendency coincident with the target rhythm note.

For the purposes of beat suppression as a feedback mechanism for training rhythmic accuracy therefore, it is essential that the time window for beat suppression be centred on (ie extend both before and after), rather than bounded by (i.e. be entirely before), the played beat of the rhythmic output pattern.

To illustrate this, the suppression behaviour of both systems is described with regard to two different playing behaviours, illustrated in Graph A (FIGS. 7A and 8A) and Graph B (FIGS. 7B and 8B).

Behaviour 1: Optimal playing behaviour (low timing variance centred on beat)

Behaviour 2: Suboptimal playing behaviour (high timing variance centred before beat) System A: As described in the detailed description of JPH096361A.

System B: Present invention.

For the purposes of further highlighting differences in performance system A is shown as having a narrower (more discriminatory) time window than System B (16 ms as opposed to 20 ms).

Strike frequencies for these behaviours with time offset relative to the target note are shown as a histogram. The time window for each system is indicated by the shaded area. Those strikes falling within the shaded area trigger the suppression behaviour for its system.

Graph A1 (FIG. 7A) shows the time window of JPH096361A relative to an optimal distribution of played strikes.

Graph A2 (FIG. 7B) shows the time window of JPH096361A relative to a suboptimal distribution of played strikes.

Graph B1 (FIG. 8A) shows the time window of the present invention relative to an optimal distribution of played strikes.

Graph B2 (FIG. 8B) shows the time window of the present invention relative to a suboptimal distribution of played strikes.

Table 1 below shows approximate suppression rates for both systems under each behaviour

TABLE 1

Suppression frequencies for Systems A and B under behaviours 1 and 2

|  | A (JPH096361A) | B (Present Invention) |
|---|---|---|
| Behaviour 1 (optimal) | 50% | 100% |
| Behaviour 2 (suboptimal) | 75% | 75% |

If maximising beat suppression is used as a feedback tool for improving rhythmic accuracy, it can be seen that a device as described in JPH096361A actively encourages playing behaviour which is suboptimal: less precise (higher variance) timing centred before the beat is suppressed more than precise (low variance) playing centred on the beat, even if the time window is more discriminatory. Conversely, the proposed system rewards correct (precise playing on the beat) with maximal beat suppression.

Paragraph 56 of JPH096361A states that "an allowance time may be provided before and after the metronome sound generation timing."

How such a timing scheme would be implemented is not described—presumably, since transmission of gate signals backwards in time is not possible, this would mean that any gating would have to be applied to subsequent beats of the metronome pattern. However, in JPH096361A's system diagram the delay unit is used both to generate the audible metronome signal and to delineate the later boundary of the time window, since the time difference detection means operates by "detecting a time difference based on the signal generated by the tempo signal generation means 1 and the signal delayed by the delay means 2" (Para. 11) and this behaviour is shown in FIG. 3 of JPH096361A.

JPH096361A as described in the system diagram is therefore structurally incapable of delineating a time window other than one with the output metronome sound at the end of the time window. Furthermore, the description of the algorithm operates on a per-beat basis, resetting the suppression behaviour into a non-suppressed state after the current beat has played.

The timing diagram (JPH096361A FIG. 3) also clearly shows the gating behaviour as being very short, on the same scale of magnitude as the timing window, indicating that what was intended was clearly suppression of the current (as opposed to subsequent) beat.

FIG. 6 illustrates the difference in time windows and system behaviour between JPH096361A and the current invention in relation to user strikes falling before and after the corresponding sequenced rhythm note.

Even allowing for structural modification in order to allow the time window to be independent of the metronome sound, in order to suppress the following beat, gate length would need to be slightly longer than the inter-beat period at a given tempo. Since the time windows are on the order of milliseconds and inter-beat periods can be on the order of seconds, this is a change of gate length time by at least 2 orders of magnitude.

Furthermore, since tempos for drumming practice can vary between c. 35 and 200 beats per minute, a fixed-length gate as described (there is no description of any adjustment of gate length) would not produce consistent subsequent beat suppression behaviour, either being too short to suppress the following beat at slow tempos, or long enough to falsely suppress multiple beats at faster tempos. The gate length would thus need to be modulated by the tempo, or some other means such as a memory unit would need to be provided in order to ensure consistent behaviour. Again, none of these features are described.

Only in hindsight of the present invention, and with the purpose of the current invention in mind, could the skilled person be expected to infer the necessity of these modifications to make the invention usable. It is perhaps for the lack of this hindsight that no commercial product has resulted from JPH096361A.

Other relevant prior art includes the Beatnik Rhythmic Analyser (Trade Name), patented as US755728762 (Method of and system for timing training).

This system shares some features with the present invention: principally detection and analysis of timing accuracy for arbitrary rhythmic patterns, and feedback to the user on rhythmic accuracy in order to allow the user to optimise their timing.

However, this invention feeds back the information to the user visually, rather than in auditory form. The visual form of this feedback is distinctive, comprising a visual 'sweep' function, and is different in character to the present invention.

While a metronome/rhythmic pattern generation function is provided, the sound from these is not suppressed in response to timing accuracy.

The visual feedback mechanism is also different in character from the visual display of the present invention—while both inventions display whether or not a drum stroke falls within or outside a particular time region with respect to a corresponding metronome pulse, U.S. Pat. No. 7,557,287B2 represents this time difference as spatial displacement, whereas the present invention's visual display uses colour/texture or similar visual differentiation.

BRIEF DESCRIPTION OF THE DRAWINGS

FIG. 3 outlines the preferred version of the algorithm as it operates at the level of repetitions of the rhythmic pattern;

FIGS. 7A and 7B show graphs of conventional variance with respect to note center; and FIGS. 8A and 8B show graphs of variance with respect to note center according to an embodiment of the present invention.

DETAILED DESCRIPTION OF THE INVENTION

Figure 1:
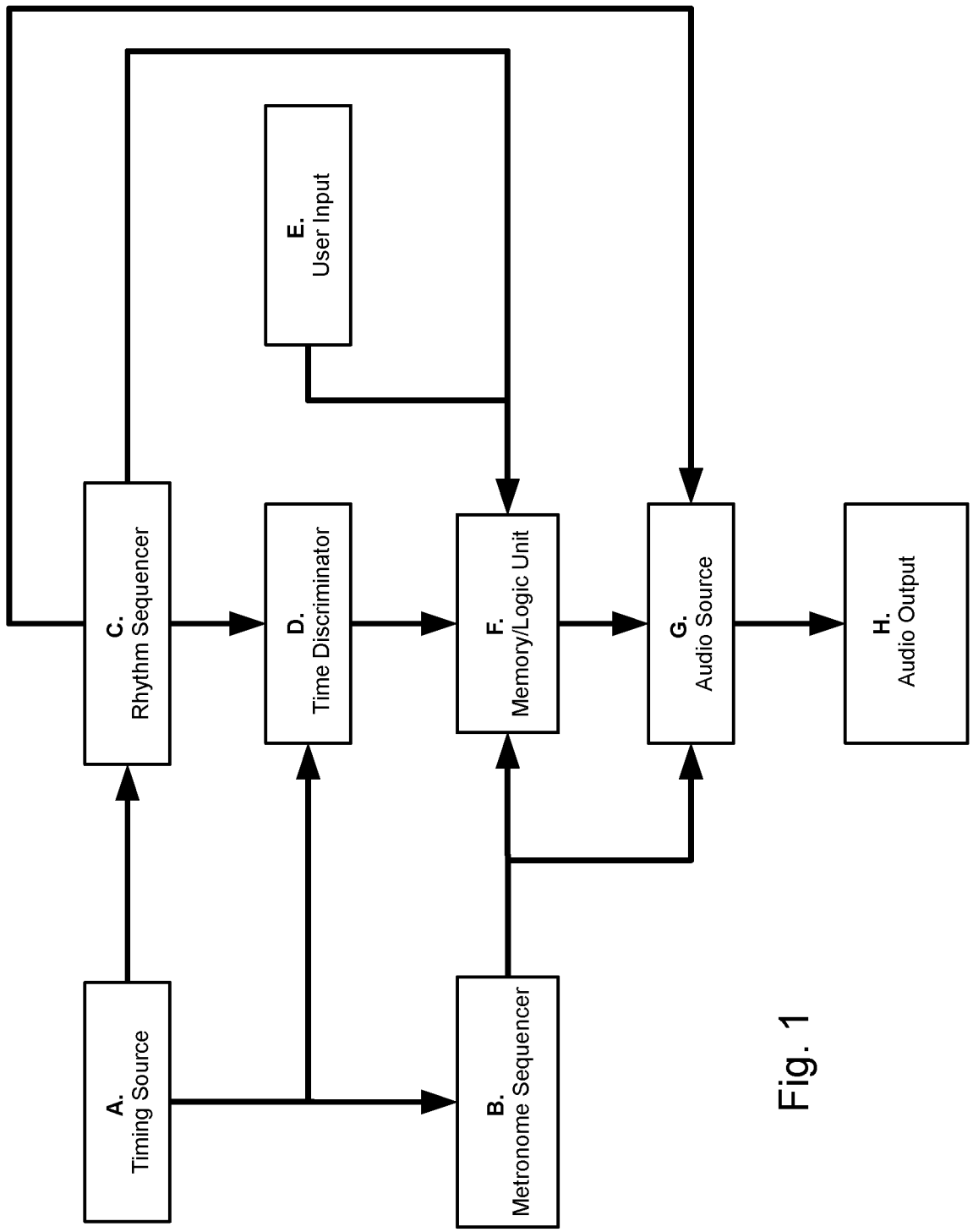
FIG. 1 shows a block diagram of the preferred embodiment of the present invention showing principal components.

Use of the method or system of the invention preferably begins with playback of a metronome and/or sequenced version of the rhythmic pattern to be rehearsed for a number of bars, to allow the user to begin to play 'in sync' with the target pattern. The audible output is then silenced while the user continues to play the pattern. A time discrimination mechanism determines whether the strikes played by the user fall within an allowable time window equally spaced before and after each sequenced note of the rhythmic pattern. Should each user strike fall within the time window of the corresponding sequenced note, the audible output will continue to remain silenced indefinitely.

Conversely, if a user's strikes fall outside the allowable time window, the audible output is reintroduced on the subsequent note of the pattern or beat of the metronome, and then continues in a non-suppressed state for a pre-determined number of bars of the pattern, enabling the user to re-synchronise their playing with the output of the rhythm generator. When these repetitions are successfully complete, audible output is once again suppressed.

The invention relates to a method of or system for teaching musical rhythm wherein the following (a), (b), (c), (d), (e) and (f) are provided:

(a) means for generating a musical rhythm pattern;
(b) means for detecting rhythm strikes of the trainee;
(c) means for sensory stimulation of the trainee when the notes of the musical rhythm pattern are played; and
(d) time window setting means set in synchrony with respective notes of said rhythm pattern;

whereby a strike within the respective time window will suppress the playing of a note of the musical rhythm pattern, but if no timely strike is detected, a note will play; and furthermore:

(e) the time window setting means are set so that a strike within predetermined periods spaced both before and after the corresponding note of the rhythm pattern will suppress the playing of the subsequent note thereof, but if no timely strike is detected and/or if more than one timely strike is detected, the subsequent note will play;
and
(f) means are provided so that after said played note, a predetermined number of further notes of the rhythm pattern will be played before the time window setting means will be re-set into a suppression state.

Preferably means are also provided so that on initiation of system operation, a predetermined plurality of notes of the rhythm pattern are played before the sensory stimulation means may be suppressed.

The term "play" of the sensory stimulation means as used herein shall be understood to encompass acoustic, light, touch or electrical sensory stimulation.

Means (a) may provide one or more selectable note patterns which may comprise metronome and/or non-metronome rhythms, and wherein the latter may be repetitive may be a relatively long passage played to completion once, or may be a randomly or algorithmically generated rhythmic pattern or sequence of patterns.

Adjusting means may advantageously be provided for adjusting the time window. Further adjusting means may similarly be provided for adjusting the number of further notes in feature (f). Additional adjusting means may similarly be provided for adjusting the sensitivity of the system to allow an adjustable number of strikes to fall outside of the time window before the playback suppression state is cancelled.

The rhythm pattern may be either a metronome or other than a metronome and means may be provided for selectively switching between a plurality of rhythm patterns, or for selecting both a metronome and one or more non-metronome rhythm patterns.

Advantageously, supplementary sound generation means may be provided to provide further feedback to the user when the metronome is in a non-suppressed state: e.g. a sequence of tones or other sounds may be played to provide a 'countdown' to the metronome suppressed state, or to indicate when the metronome behaviour is reset by a note played outside the time window.

These tones serve the purpose both of allowing the user to have confidence that their playing is sufficiently in time to induce the metronome suppression behaviour, and to reassure the user that when the suppressed state is triggered that this is the desired behaviour and not, for example, that the invention has stopped functioning, since there is a paradoxical element to the provision of positive feedback by the absence of stimuli.

An embodiment of the invention may provide multiple, spatially separated, means (b) for detecting rhythm strikes of the trainee and wherein each said detecting means is associated with a separate dedicated means (a) for generating a rhythm pattern together with associated resetting means (f). Such an embodiment may be an electronic drum kit. Such an embodiment would provide separate dedicated means (a) for generating a repetitive note rhythm pattern associated with a means for sensory stimulation of the trainee when said notes are played, such plurality of means outputting a signal of differing character, for example timbre. The invention may alternatively be embodied as a single drum practice pad which might outwardly look similar to that depicted in JPH096361A, as a multi pad practice instrument outwardly similar to that depicted in US2002062726, or as a standalone hardware device capable of accepting MIDI or drum trigger inputs from other electronic drum systems.

A method or system according to the invention may provide that the, or each repetitive note rhythm pattern is a non-metronome rhythm pattern and wherein additionally there are provided means for generating a metronome note pattern. The metronome note pattern may then either be selectively suppressed along with the non-metronome rhythm pattern, or instead of the non-metronome rhythm pattern.

In practice of the present invention the time window is preferably selected to be between 5 ms and 150 ms.

The present invention is advantageously embodied as a smartphone or tablet app or other computer application.

When carrying out the invention, the means for sensory stimulation of the trainee when said notes are played might comprise one or more loudspeakers or headphones.

The present invention would extend to a kit of parts comprising a device embodying a system as above described together with an external means for drum striking arranged for inputting to feature (d), wherein this is selectable from a microphone, a drum pad, a drum trigger device, a MIDI device or a virtual percussion area projector providing one or more means for detecting percussion strikes of the trainee.

A method, system or kit of parts according to the invention may advantageously provide that the strikes of the trainee generate a sensory stimulation of different character to that generated by the rhythm pattern(s) and/or metronome.

Advantageously in alternatives of the invention as outlined above, there is additionally provided a display means for showing in real time the notation for said rhythm pattern.

Figure 2:
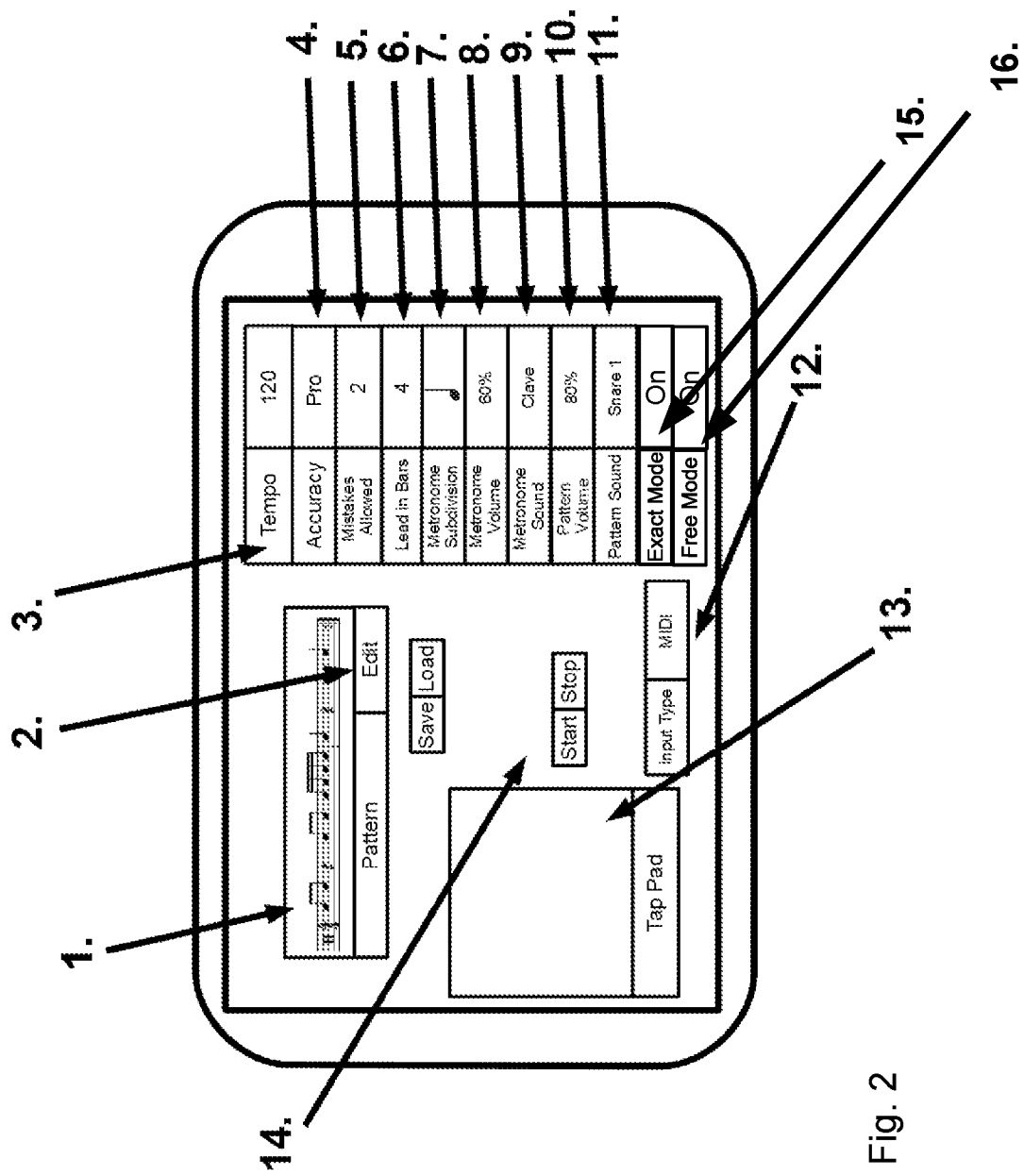
FIG. 2 shows the main interface of the preferred embodiment as a tablet or smartphone app.
Figure 2A:
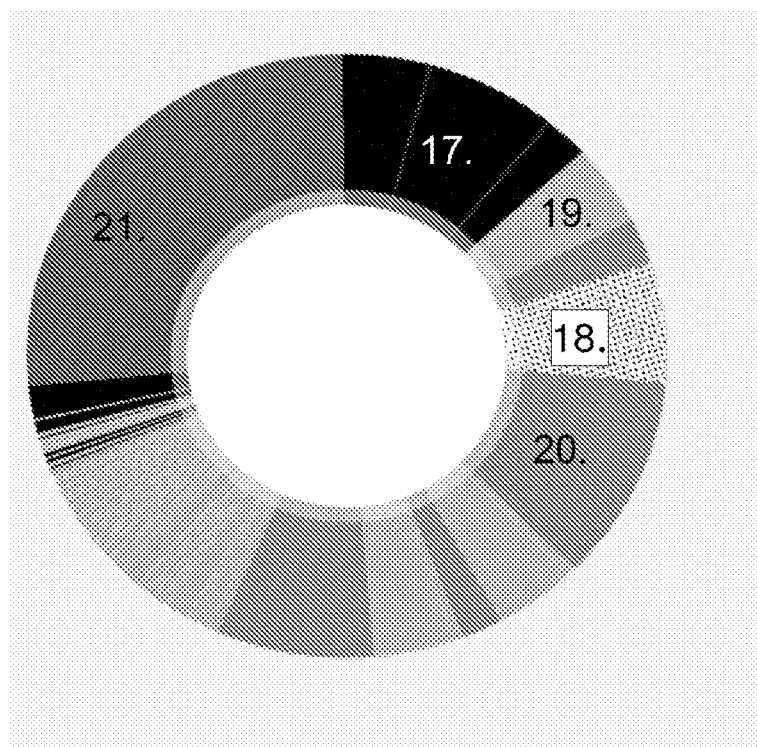
FIG. 2a shows the user interface of the preferred embodiment as a tablet or smartphone app, with the segmented visual display.

Advantageously in alternatives of the invention as outlined above, there is additionally provided a segmented visual display showing current and past states of the system during the current use session (e.g. metronome suppressed, metronome non-suppressed, strike detected in time window, strikes outside time window), as well as time remaining in the current practice session, as a 'clock' or 'pie chart' type display whereby the 'time remaining' segment of the display is progressively replaced by sections of differing colour, texture or other visually differentiating means corresponding to the current state of the system, as shown in FIG. 2a. This display is intended to combine the function of a 'time remaining' display with information on the current system status.

Furthermore, the invention may be embodied in a second version, wherein the feedback is supportively achieved by visual means, in particular:

A system for teaching musical rhythm wherein the following (a), (b), (c) and (d) are provided:

(a) means for generating a musical rhythm pattern;

(b) means for detecting rhythm strikes of the trainee;

(c) means for sensory stimulation of the trainee when the notes of the musical rhythm pattern are played; and (d) time window setting means set in synchrony with respective notes of said rhythm pattern;

whereby a strike within the respective time window will suppress the playing of a note of the musical rhythm pattern, but if no timely strike is detected, a said note will play;

wherein said system further incorporates a visual display showing current and past states of the system during the current use session (e.g. metronome suppressed, metronome non-suppressed, strike detected in time window, strikes outside time window), as well as time remaining in the current practice session, preferably as either a 'clock' or 'pie chart' type display, or as a rectilinear 'bar' type display, whereby the 'time remaining' segment of the display is progressively replaced by sections of differing colour, texture or other visually differentiating means corresponding to the current state of the system, with the 'time past' segments displaying the corresponding visually diffentiating means.

A preferred embodiment of the present invention as a tablet or smartphone app will now be described by way of example with reference to the accompanying drawings.

FIG. 1 Shows a block diagram of the preferred embodiment of the present invention showing principal components:

- A. A timing source capable of defining a tempo and start/stopping playback of attached devices at said tempo (e.g. MIDI clock generator, trigger clock source, or phasor).
- B. A metronome capable of outputting definable bar and beat subdivisions (e.g. as trigger pulses or MIDI note data) when driven by A.
- C. A programmable rhythmic pattern sequencer capable of outputting a variety of looped rhythmic note patterns (e.g as trigger pulses or MIDI note data) when driven by A., and of sending information about the content of the programmed rhythmic pattern to D.
- D. A time discriminator unit capable of defining a time window of total duration between 5 ms-150 ms, equally spaced before and after each note output by C., and of transmitting the open/closed state of the time window to F.
- E. A user input device capable of detecting user strikes, preferably utilising the inbuilt microphone of the tablet or smartphone, when a source, for example a practice pad is positioned adjacent to it.
- F. A memory/logic unit capable of processing input from the metronome, B., time discriminator D., and user input E. according to the algorithm outlined in FIG. 3, of storing and updating the values of 8 integer variables detailed in the algorithm description, and of processing these to determine the system suppression state, which is then passed to the audio generator G.
- G. An audio generator (e.g. drum synthesizer or sampler) capable of taking input from B. and C., outputting suitable sounds, passing these to H., and of modulating the volume of these sounds in orders to suppress their audible output dependent on the suppression state output from the memory/logic unit F.
- H. An audio output (e.g. to speaker or headphones), FIG. 2 Shows the main interface of the preferred embodiment as a tablet or smartphone app. The interface includes:

1. A display indicating the current rhythmic pattern output by C.
2. A means for editing the current rhythmic pattern output by C.
3. A display and means of altering the tempo defined by the timing source A.
4. A means of altering the width of the time window defined by the time discriminator D. expressed in terms of a level of difficulty ("Pro" corresponding to a narrow time window, e.g. 10-15 ms).
5. A means of controlling the value of the variable allowedWrongStrikes in the algorithm outlined in FIG. 3 and computed by the memory/logic unit F., corresponding to the number of allowable strikes per repetition of the pattern output by the pattern sequencer C. falling outside the time window defined by the time discriminator D. before audio playback volume of output from the audio source G. switches from a suppressed state to the levels specified by 9. and 11.
6. A means of altering the value of the variable syncBars in the algorithm outlined in FIG. 3, corresponding to number of bars of the rhythmic pattern to be played in a non-suppressed state before audio output is re-suppressed.
7. A means of altering the beat subdivision output by the metronome B.
8. A means of altering the non-suppressed state volume of audio output from the audio generator G. when triggered by the metronome B.
9. A means of altering the sound character of output from the audio generator G. when triggered by the metronome B.
10. A means of altering the non-suppressed state volume of audio output G. when triggered by the rhythm sequencer C.
11. A means of altering the sound character of output from the audio generator G. when triggered by the rhythm sequencer C.
12. A means of selecting the input type E. to be used for user strike detection.
13. A means for detecting user strikes via E. in the case that 12. is set to detect user finger tapping on the device screen as the input method.
14. A means of initiating and halting system operation by starting or stopping the tempo generator A.
15. A means of engaging or disengaging 'Exact Mode' in the algorithm outlined in FIG. 4 allowing or disallowing the playing of additional strikes between those of the sequenced rhythm pattern without triggering the non-suppression state, e.g. to allow variation or improvisation.
16. A means of engaging or disengaging 'Free Mode' in the algorithm outlined in FIG. 4 allowing a predetermined number of notes of the rhythm pattern to pass with no strike being detected before the non-suppression state is triggered, e.g. to allow variation or improvisation.

FIG. 2a Shows the user interface of the preferred embodiment as a tablet or smartphone app, with the segmented visual display.

17. A coloured segment indicating that no strike was detected.
18. A coloured segment indicating a strike in the time window, with the metronome non-suppressed.
19. A textured segment indicating the metronome is in a suppressed state.
20. A coloured segment indicating a strike detected outside the time window.
21. A coloured segment indicating the time remaining in the current practice session.

Means not shown may generate a distinctive note or visual indication for each strike of the trainee.

FIG. 3 Outlines the preferred version of the algorithm as it operates at the level of repetitions of the rhythmic pattern.

Figure 4:
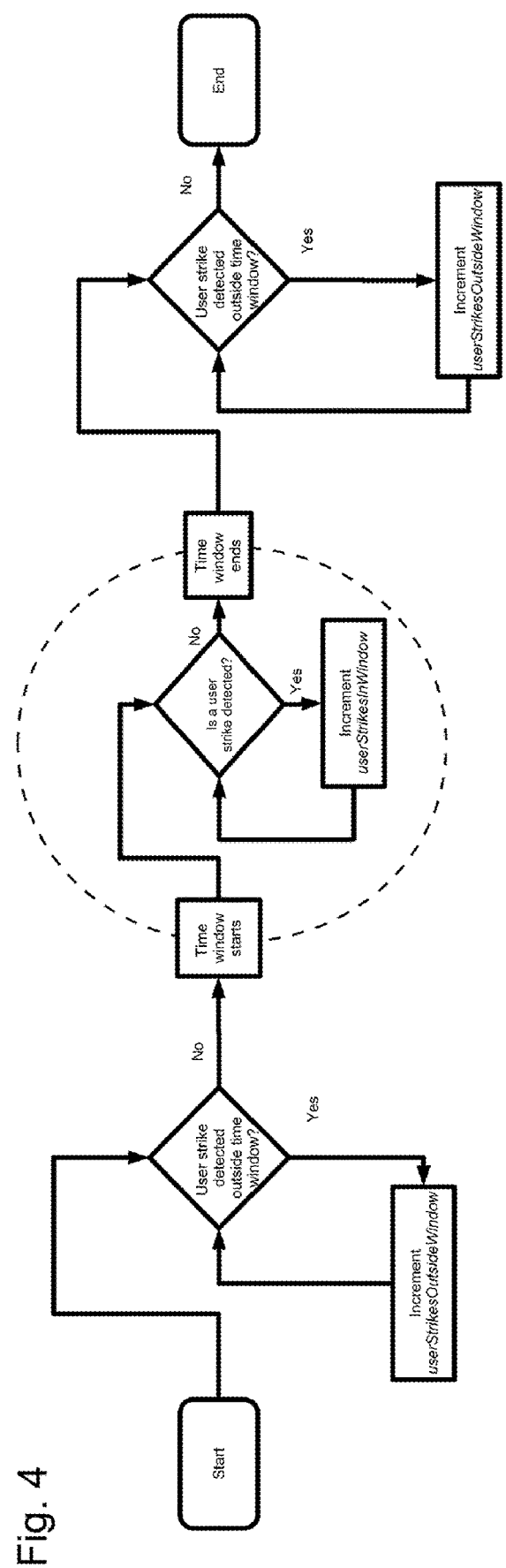
FIG. 4 outlines the detection logic of the preferred version of the algorithm.

FIG. 4 Outlines the detection logic of the preferred version of the algorithm.

Figure 5:
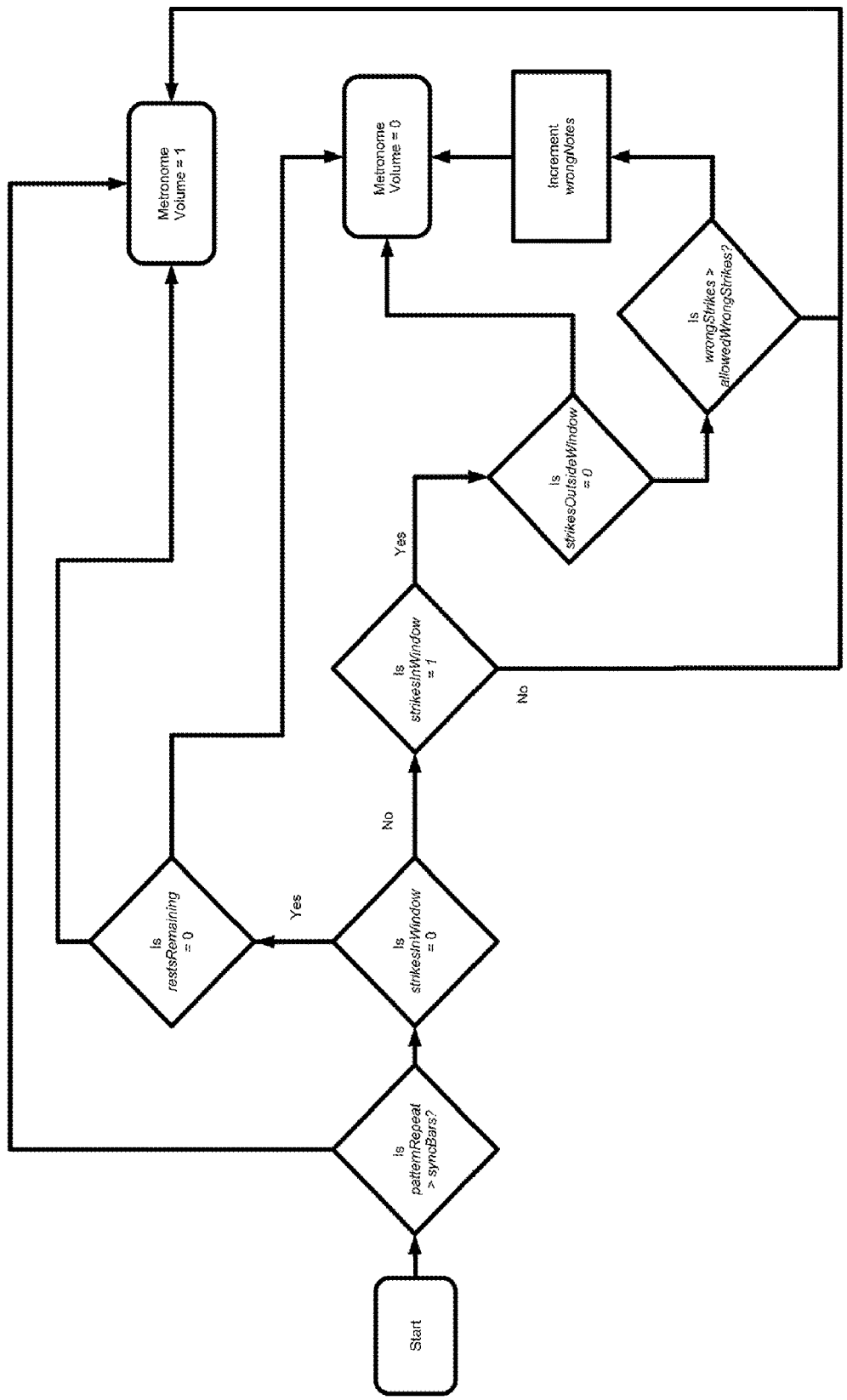
FIG. 5 outlines the preferred version of the algorithm's behaviour governing suppression or nonsuppression of the metronome sounds.
Figure 6:
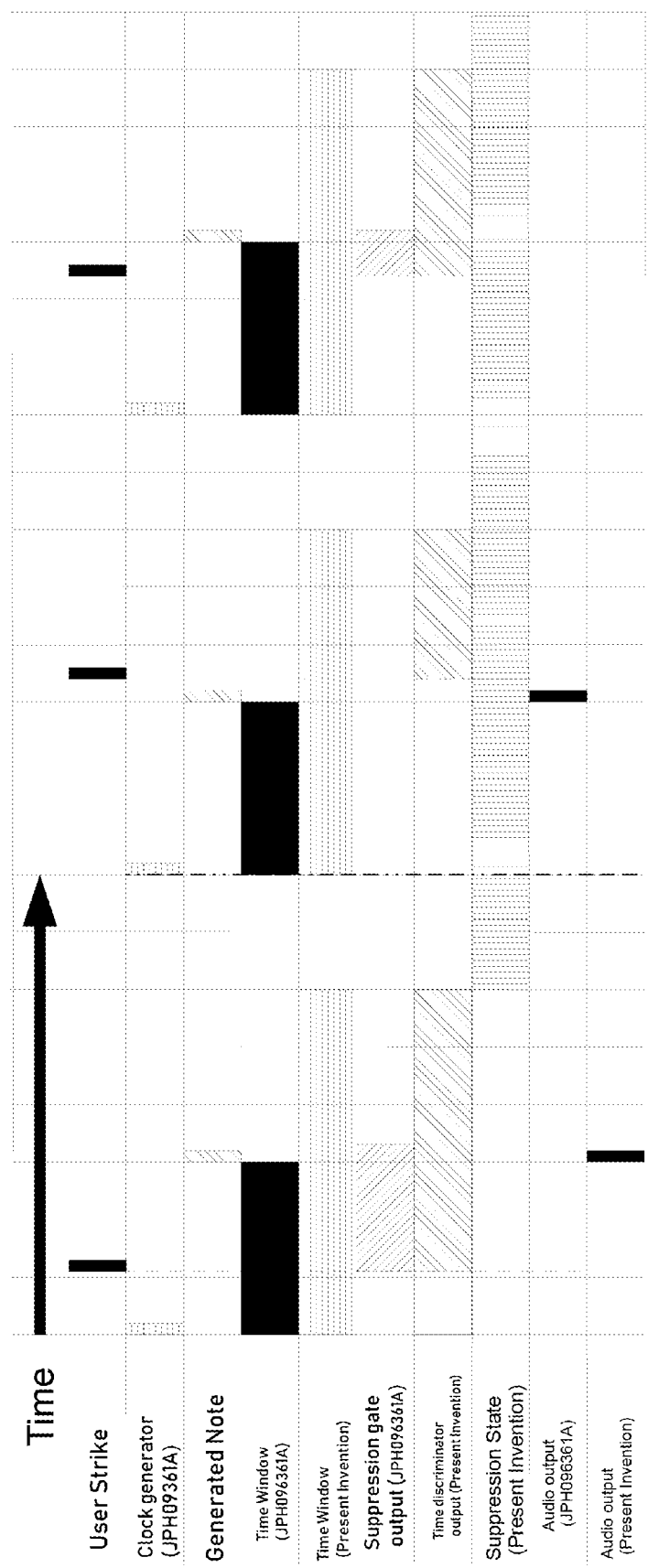
FIG. 6 illustrates the difference in time windows and system behaviour between JPH096361A and the current invention in relation to user strikes falling before and after the corresponding sequenced rhythm note.

FIG. 5 Outlines the preferred version of the algorithm's behaviour governing suppression or non-suppression of the metronome sounds.

Description of the Algorithm Carried Out by the Memory/Logic Unit F

Upon initiation of the system, the rhythmic sequence plays for a number of bars determined by the value of syncBars. After this number of repetitions, audio from the audio source G. is suppressed.

For each note played by the rhythm generator, the time discriminator D. opens the time window (total length determined by 4.) before the note is played, and closes it after the note has been played.

As long as a single strike falls within each time window, and no strike falls during the period between time windows, audio suppression is continued. Optionally, the variable restsRemaining is reset to equal the value of restsAllowed.

If no strikes, or more than one strike, fall within the time window, or (optionally) if a strike is detected outside the time window, then the variable wrong Notes is incremented.

If no strikes are detected, the variable restsRemaining is decremented.

If the value of wrong Notes exceeds allowedWrong-Strikes then audio volume from G. is set to a non-suppressed state and the rhythm pattern is repeated for a set number of bars once more.

Variables:

barCount: A count of the number of elapsed bars, incremented each time the metronome B. outputs a bar subdivision while in a non-suppressed state.

syncBars: Represents the number of full bars of audible output to be played when the non-suppressed state is triggered. Set by interface control 6.

strikesInWindow: A count of user strikes falling within the time window, incremented when the time window state is Open and a user strike from E. is detected.

strikesOutsideWindow: A count of user strikes falling outside the time window incremented when the time window state is Closed and a user strike from E. is detected.

wrongStrikes: Represents the number of incorrect user strikes for the current repetition of the rhythm pattern.

allowedWrongStrikes: Represents the maximum allowable number of incorrect user strikes before playback is set to non-suppressed. Set by interface control 5.

restsAllowed: Represents the maximum allowable number of strikes where no hit is detected before playback is set to non-suppressed.

restsRemaininq: Represents the current number of consecutive notes of the rhythm pattern remaining where no strike can be detected before playback is set to non-suppressed.

The block diagram of FIG. 1 and the algorithms of FIGS. 3, 4 and 5 can be utilised in obvious manner for creating alternative embodiments, for example a drum pad or drum kit as proposed above. The app is being commercialised as BeatBalance.

The invention claimed is:

1. A computer-implemented method for musical rhythm practice involving a rhythm pattern for the user to follow by playing struck notes, wherein the following steps (t), (u), (v), (w), (x), (y), and (z) are carried out:
   (t) outputting timing information from a timing clock source component into steps (u) and (x) below;
   (u) specifying a series of note events at spaced time positions sequenced with respect to the timing source, the series of note events comprising a musical rhythmic pattern;
   (v) detecting user struck notes;
   (w) generating an audio output with defined onset time corresponding to the musical rhythmic pattern according to the output from steps (y) and/or (z), enabling the user to hear the audio output play via audio output means;
   (x) defining a time window of duration 5-150 ms for each note of said musical rhythmic pattern, set to be opened before and closed after each respective said note;
   (y) carrying out a processing step whereby a user strike detected in step (v) within time window of step (x) will trigger a suppression state, which prevents the output to step (w) of the subsequent note of said musical rhythmic pattern, but if no timely user strike is detected in step (v) and/or if more than one timely user strike is detected in step (v), a non-suppression state will be triggered, whereby the subsequent note of said musical rhythmic pattern will be output to step (w); and
   (z) after said subsequent note of said musical rhythmic pattern output to step (w), a predetermined number of further notes of said musical rhythmic pattern are output to step (w) before the suppression state is again triggered.

2. The method according to claim 1 wherein operating the processing step (y) involves an algorithm which stores and processes the following variables:
   (i) a first variable (barCount) consisting of a count of the number of elapsed bars, incremented each time the first generating step (u) outputs a bar subdivision while in a non-suppression state;
   (ii) a second variable (syncBars) consisting of the number of full bars of audible output (w) to be played when the non-suppression state is triggered;
   (iii) a third variable (strikesInWindow) consisting of a count of user strikes falling within the time window, incremented when the time window state is open and a user strike from step (v) is detected; and
   (iv) a fourth variable (strikesOutsideWindow) consisting of a count of user strikes (v) falling outside the time window incremented when the time window state is closed and a user strike from step (v). is detected;
wherein
the algorithm processes first, second and fourth variables (i), (ii) and (iv) to generate sequential data corresponding to the respective notes of said musical rhythmic pattern and then evaluates a particular strike and its sequential position, whereby if the sequential position of said strike is higher than the sequential position of the nearest time window beginning and lower than the sequential position of the nearest time window end, it is counted as within the time window, so that the third variable (iii) (strikesInWindow) is incremented, the suppression state being maintained if third variable (iii) corresponds to a predetermined level, thus preventing output to (w) of a respective note of said musical rhythmic pattern;
and wherein
if fourth variable (iv) (strikesOutsideWindow) corresponds to a predetermined level, the non-suppression state will be triggered so that the subsequent note of said musical rhythmic pattern will output to step (w).

3. The method according to claim 1 wherein the generating step (u) comprises a metronome and/or a sequenced version of the rhythmic pattern to be rehearsed.

4. The method according to claim 1 wherein suppression of the audio output of said step (w) is achieved either by silencing the audio source or by ensuring that the generated pulses or notes do not trigger sound output from the audio source.

5. The method according to claim 1 wherein on initiation of operation, a predetermined plurality of notes are output before the audio output is suppressed.

6. The method according to claim 1 wherein stimulation of the user involves light, touch or electrical sensory stimulation.

7. The method according to claim 1, wherein step (u) selectively provides metronome and/or non-metronome notes, and wherein the latter is either repetitive, a relatively long passage played to completion once, or a randomly or algorithmically generated rhythmic pattern or sequence of patterns.

8. The method according to claim 1, wherein the time window (x) is adjustable.

9. The method according to claim 1 wherein the number of further notes in step (z) is adjustable.

10. The method according to claim 1 wherein an adjustable number of user strikes falling outside of the time window before the non-suppression state is triggered are allowed.

11. The method according to claim 1 wherein an adjustable number of notes are allowed to output where no user strike is detected before the non-suppression state is triggered.

12. The method according to claim 1 wherein user strikes within the time window must be detected during the non-suppression state whereby the non-suppression state will be maintained.

13. The method according to claim 1 wherein step (u) comprises either a metronome or other than a metronome and selective switching between a plurality of rhythm patterns, or for selecting both a metronome and one or more rhythm patterns is possible.

14. The method according to claim 1, wherein are provided multiple, spatially separated, means (v) for detecting user strikes and wherein each said detecting means is associated with a separate dedicated means (u) for generating notes together with associated resetting means.

15. The method according to claim 14 wherein each respective rhythm pattern of a said separate dedicated means (v) is associated with provision for sensory stimulation of the user when said notes are output, each thereof outputting a signal of differing character.

16. The method according to claim 1 wherein step (u) comprises a non-metronome rhythm pattern and wherein additionally metronome notes are generated.

17. The method according to claim 16 wherein the metronome notes are selectively suppressed either along with the generated non-metronome notes, or instead of the non-metronome notes.

18. The method according to claim 1, which is embodied as a smartphone or tablet app or computer application.

19. The method according to claim 1 wherein sensory stimulation of the user when the audio output is by means of one or more loudspeakers or headphones.

20. The method according to claim 1 wherein the strikes of the user generate a sensory stimulation of different quality to that provided by the generated notes.

21. The method according to claim 1 wherein a visual display is also generated, capable of showing current and past states of a system configured to perform the method, during the current use session, as well as time remaining in the current practice session, as either a 'clock' or 'pie chart' type display, or as a rectilinear 'bar' type display, whereby the 'time remaining' segment of the display is progressively replaced by sections of differing colour, texture or other visually differentiating means corresponding to the current state of the method, with the 'time past' segments displaying the corresponding visually differentiating means.

22. A system for musical rhythm practice comprising a suitable device incorporating at least one data processor and means for storing instructions that when executed by said at least one data processing device cause the method of claim 1 to be performed.

23. The system according to claim 22 wherein the data processing device comprises a smartphone, tablet or computer.

24. The system according to claim 22 embodied as an electronic drum practice pad or electronic drum kit.

25. A kit of parts comprising a system according to claim 22 together with an external means for user striking arranged for inputting to step (v), wherein this is selectable from a microphone, a drum pad, a drum trigger device, a MIDI device or a virtual percussion area projector providing one or more means for detecting percussion strikes of the user.

26. A computer program comprising instructions carried on a non-transitory computer-readable medium which, when the program is executed by computer cause the computer to carry out the technical effects of the steps of claim 1.

27. The method according to claim 1 wherein the deviation of the user's strikes and consequent suppression state is calculated according to a mean or median ensemble timing of a plurality of consecutive user strikes, rather than on the basis of each individual user strike falling inside a time window.

\* \* \* \* \*